United States Patent [19]
Rivero

[11] 3,975,713
[45] Aug. 17, 1976

[54] SIGNAL GENERATING DEVICE ACTUATED BY A NON-REUSABLE TWO CHANNEL CODED MAGNETIC RECORDING MEDIUM

[76] Inventor: Victor Rivero, Gral. Pedro Antonio de los Santos No. 70-20. Piso, Mexico City 18, Mexico

[22] Filed: June 9, 1975

[21] Appl. No.: 585,170

[30] Foreign Application Priority Data
Dec. 4, 1974   Mexico ............................... 155349

[52] U.S. Cl. ...................... 340/149 R; 235/61.7 R
[51] Int. Cl.² ......................................... H04Q 3/00
[58] Field of Search ........................... 325/396, 389; 235/61.7 R; 340/146.2, 149 R, 149 A; 178/DIG. 15

[56] References Cited
UNITED STATES PATENTS
3,344,258   9/1967   Michels ......................... 235/61.7 R

*Primary Examiner*—Harold I. Pitts
*Attorney, Agent, or Firm*—Ladas, Parry, Von Gehr, Goldsmith & Deschamps

[57] ABSTRACT

The device to generate signals to actuate electronic switches of the present invention has as its object to control the starting and duration of operation of a load connected to a power source and is actuated upon introducing a coded magnetic recording medium into a logic circuit comparator having a predetermined code; if the codes of the magnetic recording medium and the comparator coincide, a luminous electronic component is turned on to advise the user that he can operate a lever connected to a perforator which perforates the recording medium and sends a signal which combines with a coinciding signal generated by the logic circuit comparator when its code coincides with that of the magnetic recording medium introduced. This combined signal actuates a first programmable timer connected between the load and the electronic switch permitting supplying the load for a given time period. There is also included a second programmable timer connected to the electronic switch which permits initial supplying to the load through a switch having positionable electric contacts connected to the load input.

13 Claims, 3 Drawing Figures

SIGNAL GENERATING DEVICE ACTUATED BY A NON-REUSABLE TWO CHANNEL CODED MAGNETIC RECORDING MEDIUM

BACKGROUND OF THE INVENTION

This invention is related in general to apparatus for controlling the starting and duration of operation of a load connected to a power source, said load being electrical, electronic, or mechanical apparatus.

This invention is also related to apparatus controlling the quantity or period of time for the supplying of electrical energy, gas or a liquid.

In its simplest expression the invention is related to those devices which provide a product, a service, or give access to a specific place.

The devices to which the invention refers are actuated by means of the insertion therein of coins, magnetically coded tickets or any magnetic recording media.

Because the invention refers to an electronic device which includes logic circuits combined with actuating mechanical means, the scope of this invention should be restricted to devices which include electronic circuits for their control.

In addition, since the device of the present invention uses for its actuation coded magnetic recording medium, its scope should not include those devices which function when coins are inserted.

Up to the present time, devices similar to those of this invention which operate by the insertion of magnetic recording medium incorporate a great number of circuits and devices which are extremely complicated in their construction and manufacture and which do not include effective and simple means for the identification of codings and the indication of the functioning or operation of the load, thus permitting the user by means of artifice to utilize the load without complying with the requirements established therefor.

Furthermore, devices similar to those of the present invention which operate by the insertion of tickets or coded magnetic recording medium do ont invalidate them after their use, thereby permitting their improper re-use and also imposing the need for collecting said coded magnetic recording medium which have been inserted into the apparatus, in order to destroy them, with the corresponding costs of maintenance and labor involved.

Another disadvantage of many of the devices similar to those of the present invention, which operate by the insertion of coded magnetic recording medium, is that for detecting the code they require a constant speed of insertion, thereby entailing complex and costly vacuum or carrier devices.

Furthermore, for the case of a television receiver, the operation of which is controlled by a channel tuner, there has been a need for an apparatus in which the user, before cancelling the recording medium in order to operate a given channel, be entitled to watch for a short time the program on the channel in order to decide if he wants to view that channel for the whole period normally allowed by means of inserting and invalidating a recording medium or magnetically coded ticket, and wherein the time of interruption in case of power failure be computed.

SUMMARY OF THE INVENTION

In consideration of the foregoing, it is an object of the present invention to provide an electronic device actuated by coded magnetic recording media which is simpler in its construction and manufacture than those known up to the present time and which comprises simple means of code identification and an indication of the functioning or operation of the load, which improves its operation in comparison to similar devices, and making it impossible for the user by means of artifice to use the load without complying with the requirements established therefor.

Another object of this invention is to provide an electronic device or apparatus actuated by a coded magnetic recording media which, to permit operation of the load, requires the perforation or invalidation of the recording medium by the user himself, thus preventing him from using it again and obviating the collection of the recording medium once these have been inserted into the apparatus.

An additional object of this invention is to provide an electronic device actuated by coded magnetic recording media on two channels with the incidence or correspondence of time required between one and the other and which does not require constant velocity, or rather, is comparatively independent of the speed of insertion of the magnetic recording medium and which is adaptable for controlling the time of operation of a channel in a television receiver during a given period.

In this latter case, the electronic device of the present invention can be adapted to any kind of television receiver in black and white or color, controlling the operation and time of transmission of one or more selected channels, in which case the transmissions on the other channels not selected are received normally.

A further object of the present invention resides in the fact that, when the electronic control device is adapted to a television receiver, the user sees and hears the transmission in the channel or channels under control for a short time without having to destroy the magnetic recording medium.

Furthermore, once the ticket or magnetic recording medium has been inserted and perforated by the user, the television set can be turned on and off without losing the transmission of the channel under control provided this is done during the normal time lapse established for each ticket or magnetic recording medium, including interruptions due to power failure.

The electronic device of the present invention actuated by non-reusable coded magnetic recording media for generating a signal which actuates electronic switching means connecting a power source to a load; which comprises a recording medium with magnetic coding; a magnetic detecting device which receives the magnetic recording medium; a logic circuit comparator device having a predetermined code; a luminous electronic device connected to the logic circuit comparator device which lights when the code recorded on the magnetic recording medium coincides with the predetermined code in the logic circuit comparator device; a perforating device for the magnetic recording medium; lever means to actuate the perforating device; an electric switch device actuated by the perforating device when it perforates the magnetic recording medium whereby the latter electric switch device generates a signal which is combined in a logic device with the signal generated by the comparator device when the code of the magnetic recording medium coincides with the predetermined signal in the logic circuit comparator device; a first programmable timer means connected between the load and the electronic switch device which permits feeding to load during a specific time, when the electronic switch changes to its "on" condition caused by the said signal derived from the logical combination and wherein the signal feed to load is supplied during a specific time lapse determined by a constant resulting from an RC circuit device connected to said first programmable timer means; a second programmable timer means connected to said electronic switch device, a switch device between source and load, which permits initial supply to load depending on the electronic switch being actuated by the second programmable timer means for certain time; a second circuit RC device connected to said second programmable timer means to control the supply time from source to load.

These and other objects to be attained in the application of this invention will be better understood and more fully appreciated in the following description which refers to the attached drawings of the preferred embodiments thereof.

DETAILED DESCRIPTION OF THE INVENTION

Figure 3:
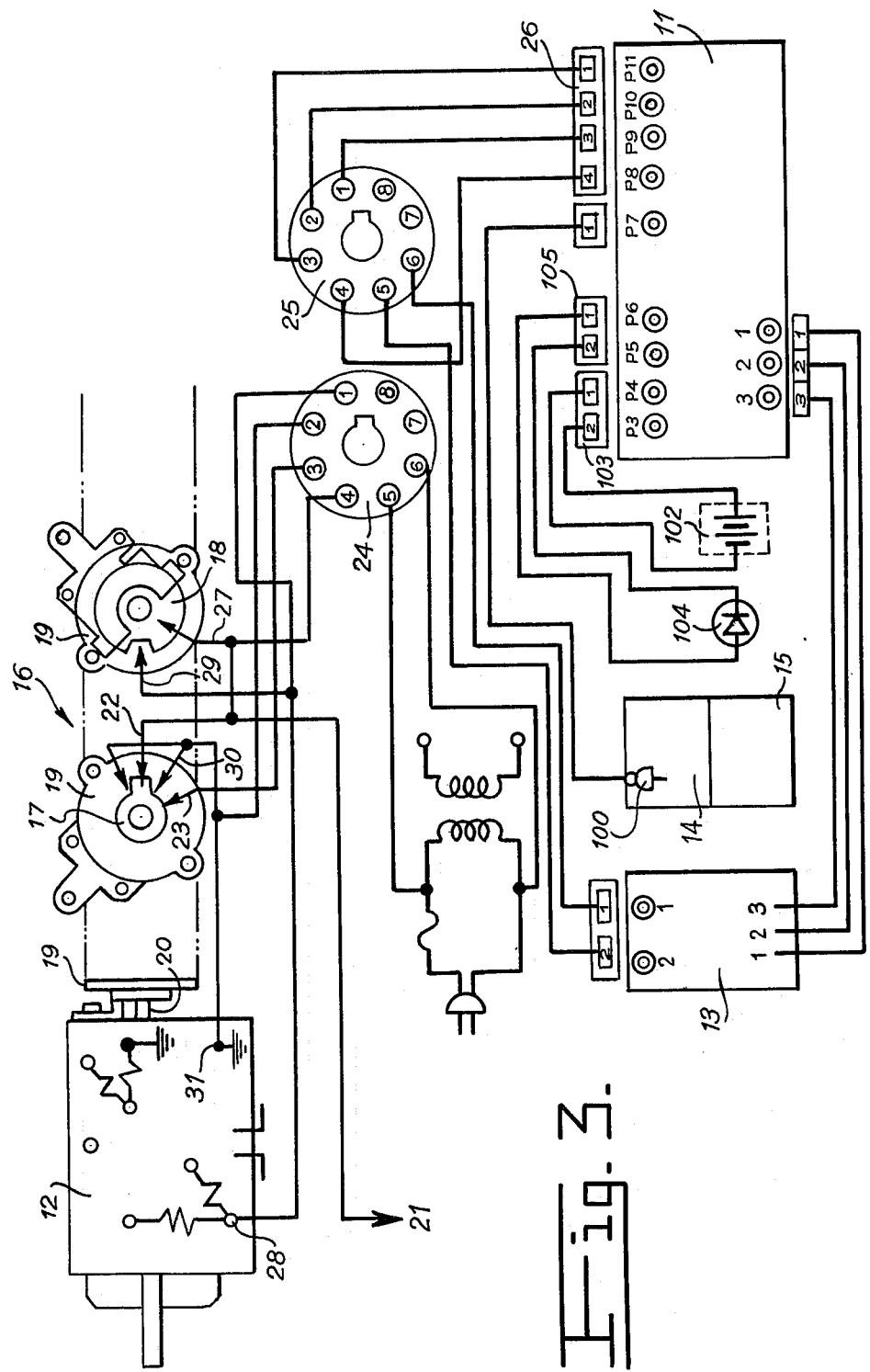
FIG. 3 is a semi-schematic view of the switch with positionable contacts for selecting a transmission channel in a television receiver tuner to which is applied the control device of the present invention.

Referring to the drawings, and particularly to FIG. 3, programmable timer 11 is shown connected to channel tuner 12 of a television receiver set, in conjunction with the modules of power source 13, logic circuit 14, ticket receiver 15, in which electric switch 16 with positionable contacts 17 and 18 is supported on a wafer 19 mounted on the end of shaft 20 of channel tuner 12. In the case illustrated in FIG. 3, positionable contacts 17 and 18 are placed on support wafer 19 in such a manner as to permit controlling the functioning and time of operation of the second transmission channel of tuner 12, the latter being precisely in the position corresponding to the channel under control.

Figure 2:
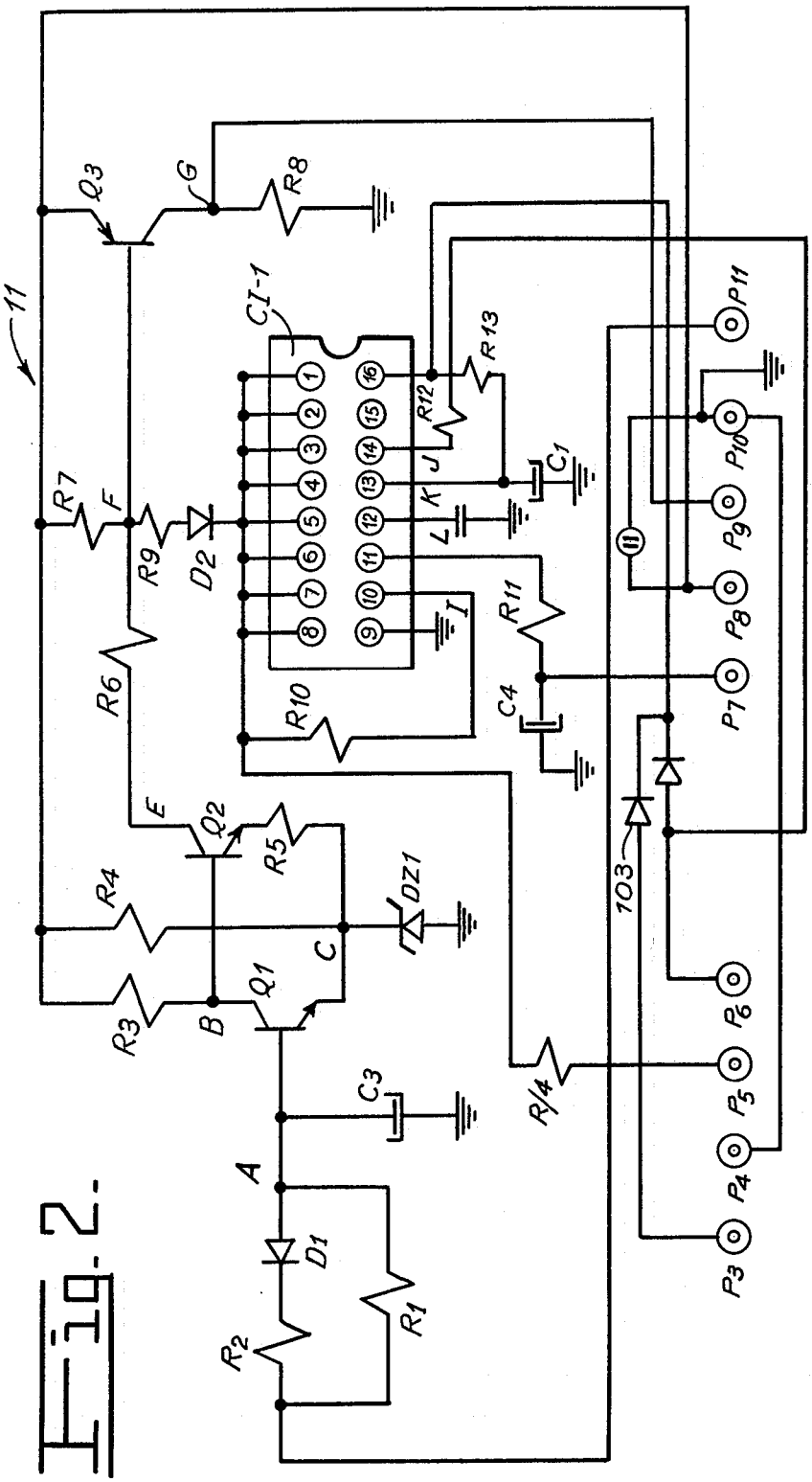
FIG. 2 is a diagram of the time programming electronic circuit of the electronic control device of the present invention.

To describe the functioning of the programmable timer 11, referring to FIGS. 2 and 3, once the television set is connected to the line and turned on and its controls for brightness, contrast etc. have been adjusted, the normal transmission will be observed on the screen but only for a brief time period previously programmed, after which both the image and sound will disappear.

The supply voltage for tuner 12 comes from the television set from point 21 on FIG. 3 passing through contacts 22, 23, 24-3, 25-3, since 24 and 25 are placed one above the other, 26-1, 11-P11, since 26-1 and 11-P11 are electrically connected. Now passing to FIG. 2, from P-11 the supply voltage charges condenser $C_3$ through resistance $R_1$ in a period of time which is predetermined by the equation $T = K.R_1.C_3$ in which K is a function of the reference voltage of diode $DZ_1$ and $R_1$ is the resistance of $R_1$ and $C_3$ is the capacitance of $C_3$. During this time "T", the user observes and hears the transmission of the channel under control. In addition it is observed that the supply voltage at point 21 of FIG. 3 also passes through contacts 27, 24-4, 25-4, 26-4 and 11P8 since these latter two points are electrically connected. In FIG. 2 the voltage which is present at 11-P8 biases the collectors of transistors $Q_1$ through $R_3$ and $Q_2$ through resistances $R_6$ and $R_7$, the emitter of $Q_3$ and integrated circuit CI-1 through $R_7$, $R_9$ and diode $D_2$. When $C_3$ has been charged in time "T" this voltage biases the base of transistor $Q_1$, causing it to conduct and thereby lowering its collector voltage at point "B" to a level at which transistor $Q_2$ ceases to conduct, whereby its collector at point "E" rises in voltage thus biasing the base of transistor $Q_3$ at point "F" so that this transistor $Q_3$ also ceases to conduct, and because transistor $Q_3$ is in series with the supply voltage to channel tuner 12, by way of 11-P9, and FIG. 3 from 11-P9 to 26-3; 25-1 and 24-1 are connected electrically to point 28 of channel tuner 12, said transistor $Q_3$ thus functions as an electrical switch which prevents the voltage supply to tuner 12, which ceases to function; the screen will shown the normal sweep pattern, that is without an image and without sound in the transmission of the channel under control. When channel tuner 12 changes channel in either direction away from the channel under control, for example toward the next lower channel as shown in FIG. 3, the supply voltage to the channel tuner coming from the television set at point 21 would reach the tuner via contacts 27, 29 which would be connected electrically through positionable contact 18 to point 28 of the tuner, thus providing the supply voltage required by the channel tuner 12 for the transmission of this other channel different from the one under control; furthermore, with 27 and 29 in contact, 24-4 and 24-1, 25-4 and 25-1, 26-3 and 26-4 are commonly connected as well as 11-P8 with 11-P9 and accordingly as can be seen in FIG. 2 the collector and emitter of transistor $Q_3$ are bridged. In addition, through positionable contact 17 of FIG. 3 terminal 30 would enter into contact with 23 connecting ground 31 to 24-3, 25-3, 26-1, 11-P11, permitting condenser $C_3$ of FIG. 2 to discharge to ground by way of diode $D_1$ and resistance $R_2$, since resistance $R_2$ is much lower than resistance $R_1$, leaving condenser $C_3$ prepared to receive once more the charge to provide the complete time "T", when the channel tuner returns to the position of the channel under control. If the discharge to ground by condenser $C_3$ is not effected when channel tuner returns to the position of the channel under control in a period of time which did not allow for the complete discharge of $C_3$ the time previously fixed for observation of the transmission of the channel under control would be shortened. The discharge of $C_3$ will occur whenever upon the channel tuner is positioned to either side of the channel under control.

The medium used for magnetic recording is a ticket of laminar material which includes previously coded information in two channels; one digital (DATA) and the other channel synchronous information (CLOCK), both signals coded with the incidence or correspondence in time required between them.

The manufacturing technique for the recording medium is well known, and the ticket can be of cardboard or plastic with a strip of magnetic material, sheets of treated paper or cardboard including magnetic materials, or in fact any of the known variations which is suitable for the magnetic coding of the ticket.

Figure 1:
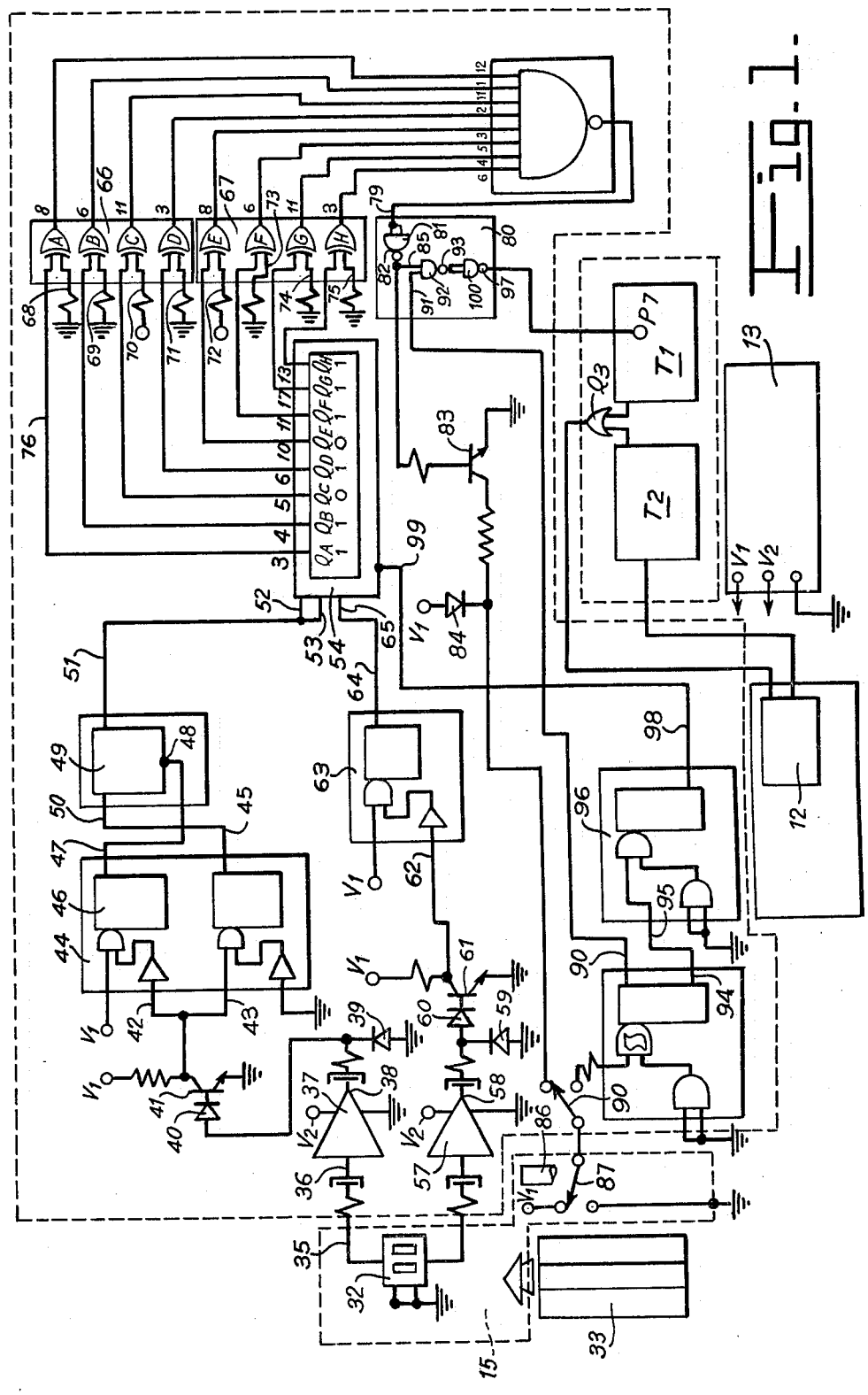
FIG. 1 is a semi-schematic view of an electric and electronic diagram which includes logic circuits of the electronic control device of this invention connected to a television channel tuner.

The sensor or magnetic reader 32 indicated in FIG. 1 is a two channel sensor one channel detects the synchronous information (CLOCK) and the other channel the digital information (DATA), which makes the system reasonably independent of the speed of insertion of the ticket. Accordingly, in this apparatus no mechanisms are required for transporting the ticket at a required velocity for the decoding of the ticket as in similar apparatus.

When ticket 33 illustrated in FIG. 1 is introduced into ticket receiver 15, sensor 32 mounted on receiver 15 detects the coding of the two channels of the ticket. At terminal 35 of sensor 32 we obtain the signal corresponding to (DATA) channel which is applied to terminal 36 of the operational amplifier 37, obtaining an amplified signal at its terminal 38. Diode 39 conducts with the negative pulses, passing only the positive pulses which in turn through diode 40 saturates transistor 41, and inverted in the collector thereof and in terminals 42 and 43 of two multivibrators of an integrated circuit 44. This signal is obtained at output terminal 45 of integrated circuit 44 inverted and with pulses of short duration. Furthermore the signal at terminal 42 of integrated circuit 44 excites multivibrator 46 to a logic state "1" at its terminal 47 with a signal of longer duration than the total time of the signal at terminal 45. This signal when applied to terminal 48 of multi-vibrator 49 permits this change of state with each pulse of the signal applied to its terminal 50, producing signal at its output terminal 51, which is applied to terminals 52 and 53 of the shift register 54.

Referring now to the other channel of sensor 32, as its terminal 55 the signal corresponding to synchronous information (CLOCK) is obtained, which is applied to terminal 56 of operational amplifier 57, and the amplified signal is obtained at its terminal 58. Diode 59 conducts with the negative pulses passing only the positive pulses and these in turn, through diode 60, saturates transistor 61, and inverted in its collector and at terminal 62 of multivbrator 63. This signal is obtained inverted at outlet 64 of multivibrator 63 and is applied to input terminal 65 of the shift register 54.

Now then, the two signals applied to the shift register 54 at its terminals 52, 53 and 65 combine, producing a logic output signal at its terminals 54-3, 54-4, 54-5, 54-6, 54-10, 54-11, 54-17 and 54-13, which corresponds to the code which sensor 32 reads from magnetic ticket 33. In the case exemplified in FIG. 1, the code detected in the shift register 54, at the terminals cited from last to first, is 11101011. The output logic signals from the shift register 54 are applied to two integrated logic circuits 66 and 67, each having four gates EXCLUSIVE-OR. One of the inputs of each of the gates of integrated logic circuits 66 and 67 has been previously biased to logic "0" or logic "1", as is illustrated in FIG. 1; at terminals 68, 69, 71, 73, 74 and 75, are at logic "0" and terminals 70 and 72 are at logic "1".

Accordingly, in integrated logic circuits 66 and 67 the code to be accepted at receiver 34 is fixed and determined beforehand. The operation of an EXCLUSIVE-OR gate depends on the input signals being different in order to obtain an output signal of logic "1" from the gate. Therefore, with the output signals indicated in FIG. 1 from the shift register 54 applied to the other inputs not previous biased of the gates of integrated logic circuits 66 and 67, we obtain at each one of outputs 66-8, 66-6, 66-11, 66-3, 67-8, 67-6, 67-11 and 67-3, respectively, a logic "1" signal; thus for example, with regard to gate "A" of integrated logic circuit 66 we observe that its input terminal has been biased to logic "0", likewise we observe that the signal of logic "1" applied to its other input terminal 76 that comes from the output terminal 54-3 of shift register 54, results in an output of logic "1" of gate "A". Once we obtain the logic "1" output signal of each of the gates of integrated logic circuits 66 and 67, these signals applied to inputs 77-6, 77-4, 77-5, 77-3, 77-2, 77-11, 77-1 and 77-12 of a NAND type eight inputs gate 77 we obtain a logic "0" signal at its output terminal 78, which is applied to input terminal 79, an inverter 81 of integrated circuit 80.

At the output of terminal 82 of this inverter 81 we obtain a logic "1" signal, which when applied to the base of transistor 83 when the latter is already biased at its collector passes from the cut-off condition to that of saturation, conducting such a current as will light the light emitting diode 84, indicating that magnetic ticket 33 has the authorized code for operation of the apparatus.

In case the coding of the ticket were such that one or more outputs of integrated logic circuits 66 and 67 would produce a logic signal "0", then the signal of output 78 of integrated circuit 77 would be logic "1". This signal of logic "1" applied to inverter 81 at its terminal 79 would produce a logic signal "0 " at its terminal 82, which when applied to the base of transistor 83 would biased it incorrectly with the result that light emitting diode 84 would not light, indicating that the ticket does not have the correct coding.

If ticket 33 is withdrawn from receiver 34, light emitting diode 84 turns off.

Logic signal "1" obtained at terminal 82 of integrated circuit 80 is also applied to input terminal 85 of another NAND gate.

Thus far the circuit has been described with regard to its functioning for detecting and comparing the coding of ticket 33 with the code previously established, and to indicate its acceptance by means of the light emitting diode 84. The following step to achieve operation of the television set consists of destroying the ticket. Once the user observes that ticket 33 has been accepted, he proceeds to manually actuate a lever which forms part of receiver 34, which moves a punch 86 which perforates ticket 33. Upon completing the perforation and hence the destruction of the code registered on ticket 33, the punch at the end of its stroke actuates microswitch 87 sending a logic signal "0" to the input terminal 88 of monostble logic circuit 89, provided that microswitch 90 which is normally open is closed by the presence of ticket 33 in receiver 34, to assure said presence of ticket 33 when actuating punch 86. Monostable circuit 89 is designed with a long time constant so that logic signal "1" produced at its terminal 90 from the integrated circuit and applied to terminal 91 of integrated circuit 80 at the same time as logic signal "1" is applied to terminal 85 of the same gate 92, will last long enough to obtain a logic signal "0" at output terminal 93 of gate 92.

This logic signal "0" is obtained only if the following two requirements are met:
 1. That the ticket has the correct coding
 2. that the punching of the ticket be performed.

It may be mentioned here that when punching ticket 33 actuating microswitch 87, a logic signal "0" is also obtained at output terminal 94 of integrated circuit 89. This logic signal "0" is applied to terminal 95 of monostable integrated circuit 96 and with a delay milisecond relative to the output logic signal "1" of terminal 97 of integrated circuit 80 obtained from the logic signal "0" from terminal 93 of gate 92, so that logic signal "1" of output 97 of integrated circuit 80 activates programmable timer T1 before the logic signal "0" from output 98 of integrated circuit 96 can reach terminal 99 of shift register 54 erasing the information registered. The output logic signal "0" from terminal 98 of integrated circuit 96 applied to terminal 99 of the shift register 54 erases the stored code of the ticket and at the same time due to the elimination of the code the light emitting diode 84 goes out.

These two operations prepare the shift register 54 for evaluating the next ticket.

Now then, the signal obtained from terminal 93 of gate 92 is applied to the input terminals of an inverter 100 of integrated circuit 80. From the output of terminal 97 of integrated circuit 80 we obtain a logic signal "1" which is applied to programmable timer T1, at terminal 11 of integrated circuit CI-1 of FIG. 2 via P7. In reference to FIG. 2 integrated circuit CI-1 is operating in monostable condition and its output signal at point 101 is normally logic "1" and subsequently passes to logic "0" when excited at its terminal 11 by a logic signal "1" via P-7.

The output at point 101 is kept in logic "0" for an interval "T-1" of time and latter returns to logic "1". Time T-1 is controlled with parameters C-1 and R-13 with the following equation: T-1 (in seconds) equal to (C-1 × R-13 × 255). Now then, upon receiving at P-7 the logic signal "1" from output terminal 97 of the integrated circuit 80 of FIG. 1, point 101 of integrated circuit CI-1 of FIG. 2 passes to logic "0", which means that there is a conduction of current via P-8 through resistors $R_7$, $R_9$ and $D_2$ to point 101. This current flow forms a voltage divider at the point of intersection of $R_7$ and $R_9$ (Point F) biasing the base of transistor $Q_3$ in such a manner that the latter begins to conduct raising its collector voltage (point G) to the level of voltage required by the channel tuner supplied via 11-P9 of FIG. 3, 26-3, 25-1, 24-1 to point 28 of the tuner. With this supply, an image and sound are obtained from the television receiver; otherwise, if $Q_3$ of FIG. 2 does not conduct, the tuner does not receive its supply voltage and neither sound nor image will be obtained from the television receiver.

Accordingly, and provided that the ticket has been identified and invalidated, the state of operation of integrated circuit CI-1 of FIG. 2 controls the on-off state of transistor $Q_3$ an electronic switch, for controlling the initation and time of operation of the television set.

In the event of a power failure while the television set is functioning within the time contracted, an emergency supply source, battery 102 of FIG. 3 enters into operation simultaneously with the power failure, and provides the voltage required via 103-2, P3, diode 103 of FIG. 2, terminal 16 of integrated circuit CI-1 of the programmable timer so that the latter continues to function while the power is off; the television set would of course cease to function. Without battery 102, the integrated circuit CI-1 would lose its supply voltage, would stop registering the remaining operating time, and would require the insertion and invalidating of another ticket to initiate again the operation of the television receiver when the power is resumed.

Diode 103 protects the battery 102 from consuming current when the normal supply voltage is present at integrated circuit CI-1 through P6.

The circuit of the invention also includes a second light emitting diode 104 of FIG. 3, which lights during the contracted time; the excitation circuit for this diode 104 is through the power source, P6, 105-1, light emitting diode 104, 105-2, P5 and then in FIG. 2, via R14 to point 101 of integrated circuit CI-1, which when activated produces a potential difference to turn on the light emitting diode 104.

While the foregoing description is drawn to one embodiment of the present invention, it will be understood by persons skilled in the art that what is described above and modifications in form or detail are included in the scope and spirit of the invention.

I claim:

1. An electronic device actuated by non-reusable, coded magnetic recording media in two channels to generate a signal activating electronic switch means which connect a power source to a load, which comprises recording media with magnetic coding, a magnetic detecting device which receives said magnetic recording media, a logic circuit comparator means having a predetermined code, a luminous electronic device connected to the logic circuit comparator means which lights when the code registered on the magnetic recording medium coincides with the predetermined code in the logic circuit comparator means, a device for punching the magnetic recording medium, lever means for actuating the punching device, electric switch means actuated by the punching device upon punching the magnetic recording medium whereby said electronic switch means generates a signal which is combined in a logic device with the signal generated by the comparator means when the code of the magnetic recording medium coincides with the predetermined code in the logic circuit comparator means, a first programmable timer means connected between the load and the electronic switch means which permits supply to the load during a given time when the electronic switch changes to its "on" condition as a result of the said signal resulting from the logic combination and in which supply to the load is carried out during a time period determined by a constant resulting from a RC circuit means connected to said first programmable timer means, a second programmable timer means connected to said electronic switch means, a switch device between source and load which permits initial supply to load depending on the actuation of the electronic switch by the second programmable timer means for a given period, a second RC circuit means connected to second programmable timer means to control the time supply from source to load.

2. An electronic device actuated by non-reusable coded magnetic recording media as described in claim 1, in which the electronic switch means is a transistor means having its collector and emitter connected in series with load and power source and which includes in its collector a resistance proportional to the voltage required by the load and in which said transistor means has its base and collector connected in series with the first programmable timer means.

3. An electronic device actuated by non-reusable coded magnetic recording media as described in claim 2, in which the second programmable timer means is connected in parallel with said first programmable timer means and in series with the base and collector of said electronic switch means.

4. An electronic device actuated by non-reusable coded magnetic recording media as described in claim 1, in which the load is a channel tuner of a television receiver which includes electric switch means comprising positionable electric contact means for selecting the connection of second programmable timer means to specific transmission channels.

5. An electronic device actuated by non-reusable coded magnetic recording media as described in claim 1, in which the logic circuit comparator means is a shift register device having one of its terminals connected to one of the inputs of digital logic gates "or exclusives" having their other input terminal previously logically biased, in which the outputs of the digital logic gates are connected to the input of a NAND logic circuit with a corresponding number of inputs, for the purpose that in these NAND logic circuit inputs such a condition of logic biasing will be reached as to obtain a logic output signal supplied to an integrated circuit which includes logic gates which permit of actuating the first said programmable timer means when in addition one of the NAND type logic gates receives said signal generated by the electric switch actuated by the punch for the magnetic recording medium and in which the output signal of said NAND logic circuit when it passes through one of the logic gates which inverts the said integrated circuit turns on a luminous diode which indicates the coincidence of code between the shift register device and the code of the magnetic recording medium.

6. An electronic device actuated by non-reusable coded magnetic recording media as described in claim 5, in which the said integrated logic circuit connected to said NAND circuit includes an inverting gate connected between the output of said NAND circuit and the luminous electronic means, having its output connected to the input of the second NAND gate of said integrated circuit, having its other input connected by means of a monostable multivibrator to the electric switch actuated by the punch for perforating the magnetic recording medium and which includes the output of this second NAND gate to an inverting gate of the said integrated circuit connected to said first programmable timer means.

7. An electronic device actuated by non-reusable coded magnetic recording media as described in claim 5, in which the shift register means receives a detecting one of the signals in one of the channels on the magnetic recording medium from the positive output of a multivibrator which has one of its inputs connected to the positive output of a second multivibrating means and which has the erase terminal connected to the positive output of a third multivibrator; in which one of the inputs of the second multivibrator is connected to ground and one of the inputs of the third multivibrator is connected to the power source; and where the second and third multivibrators have another of their inputs connected together to the collector of a transistor device which has its emitter connected to ground and its base connected to an operational amplifier means which receives the signal detected by one of the channels of a dual channel magnetic sensor, which in the other of its channels detects a signal which it sends to a second operational amplifier to which it is connected, which in turn is connected to the base of a second transistor means which has its collector connected to one of the inputs of a fourth multivibrator which has its other input connected to the power source and its output connected to the shift register means; these two signals combined give us the logic code registered on the magnetic recording medium which is compared with the code previously set up in the register for sending the said signal to the first programmable timer means; and where the shift register means has its erase terminal connected to the negative terminal of a monostable multivibrator which has one of its inputs connected to ground and another input connected to the negative output of the monostable multivibrator connected to the electric switch, actuating the punch perforating the magnetic register means in order to delay the erase signal of the shift register means until the actuating signal of the first programmable timer means has operated it.

8. An electronic device actuated by non-reusable coded magnetic recording media as described in claim 7, in which the circuit carrying the signal sent by the switch actuated by the perforating punch for the magnetic recording medium includes a second electric switch normally open in series with the first mentioned switch which is mechanically actuated when the magnetic recording medium is supported therein.

9. An electronic device actuated by non-reusable coded magnetic recording media as described in claim 1, in which the first programmable timer means is connected in parallel to the second programmable timer means and both are connected to the television receiver tuner, through electronic switch means.

10. An electronic device actuated by non-reusable coded magnetic recording media as described in claim 1, in which the first programmable timer means comprises an integrated circuit means which operates in the monostable condition and which, upon receiving the signal sent by the logic circuit when the code of the magnetic recording medium is correct, is actuated permitting current flow through its terminals during a time given by an RC circuit connected to its terminals and which when it permits this "on" condition through itself biases the electronic switch means, permitting current flow therethrough to the tuner during a period of time determined by the said RC circuit.

11. An electronic device actuated by non-reusable coded magnetic recording media as described in claim 1, in which the second programmable timer means includes a pair of NPN transistors connected in cascade and a voltage source through an RC circuit in such a manner that when it reaches a certain level of the charge of the condenser of the RC circuit, the voltage reaching the base of one of the transistor means permits current flow through the emitter, combining the biasing of the other of the two said transistor means to its out state, and because this second transistor means is in turn connected in cascade to the electronic switch means, when changing its state to cut it interrupts the conductance to the tuner, whereby the time of this second programmable timer means is determined by said RC circuit.

12. An electronic device actuated by non-usable coded magnetic recording media as described in claim 11, in which the condenser of the said RC circuit discharges when it is connected to ground, resetting the initial condition before the condenser was charged, from normal conduction to non conduction, both in the two transistor means connected in cascade as well as in the electronic switch means.

13. An electronic device actuated by non-reusable coded magnetic recording media as set forth in claim 12, in which the said RC circuit is connected to ground upon changing the positionable electric contact means to another different one of the selected transmission channels.

\* \* \* \* \*